US012704147B2

(12) United States Patent
Torii et al.

(10) Patent No.: US 12,704,147 B2
(45) Date of Patent: Aug. 11, 2026

(54) STUD BOLT

(71) Applicant: NITTOSEIKO CO., LTD., Kyoto (JP)

(72) Inventors: Shingo Torii, Kyoto (JP); Keiichi Miyata, Kyoto (JP); Satoshi Shirahase, Kyoto (JP)

(73) Assignee: NITTOSEIKO CO., LTD., Kyoto (JP)

( * ) Notice: Subject to any disclaimer, the term of this patent is extended or adjusted under 35 U.S.C. 154(b) by 370 days.

(21) Appl. No.: 18/256,383

(22) PCT Filed: Apr. 23, 2021

(86) PCT No.: PCT/JP2021/016454
§ 371 (c)(1),
(2) Date: Jun. 7, 2023

(87) PCT Pub. No.: WO2022/123805
PCT Pub. Date: Jun. 16, 2022

(65) Prior Publication Data

US 2024/0018992 A1 Jan. 18, 2024

(30) Foreign Application Priority Data

Dec. 8, 2020 (JP) ................................ 2020-203543

(51) Int. Cl.
*F16B 39/282* (2006.01)

(52) U.S. Cl.
CPC .................................. *F16B 39/282* (2013.01)

(58) Field of Classification Search
CPC ..................................................... F16B 37/068
USPC .................................................. 411/180, 187
See application file for complete search history.

(56) References Cited

U.S. PATENT DOCUMENTS 1,820,556 A 8/1931 Campbell et al.
1,968,516 A * 7/1934 Dieter .................... F16B 35/04 411/399
2,049,259 A 7/1936 Greenwell
3,241,422 A 3/1966 Heimovics
(Continued)

FOREIGN PATENT DOCUMENTS

CN 110662904 A 1/2020
GB 1408532 A 10/1975
(Continued)

OTHER PUBLICATIONS

The extended European search report issued by the European Patent Office on Sep. 13, 2024, which corresponds to European Patent Application No. 21902912.1-1015 and is related to U.S. Appl. No. 18/256,383.

(Continued)

*Primary Examiner* — Flemming Saether
(74) *Attorney, Agent, or Firm* — Studebaker Brackett PLLC

(57) ABSTRACT

A stud bolt to be fixed, in a retained state and a rotation stop state, to a mounting target plate includes a head, a screw shaft portion, a rotation stop portion, an annular groove, and an annular protrusion. The mounting target plate is to be sandwiched between a bearing surface of the head and the annular protrusion. A recessed portion recessed toward an upstream side in a screw advance direction is formed at the rotation stop portion.

20 Claims, 6 Drawing Sheets

(56) References Cited

U.S. PATENT DOCUMENTS

| | | | | |
|---|---|---|---|---|
| 3,770,037 | A * | 11/1973 | Ernest | F16B 35/06 411/184 |
| 3,967,669 | A | 7/1976 | Egner | |
| 4,637,766 | A | 1/1987 | Milliser | |
| 4,985,978 | A * | 1/1991 | Milliser | B23P 19/062 29/520 |
| 5,513,933 | A | 5/1996 | Rom | |
| 5,797,175 | A * | 8/1998 | Schneider | B23P 19/062 29/520 |
| 7,607,877 | B1 * | 10/2009 | Lam | H05K 7/1407 439/157 |
| 8,096,743 | B2 * | 1/2012 | Babej | F16B 37/068 411/188 |
| 8,434,985 | B2 * | 5/2013 | Babej | B21K 1/702 411/180 |
| 2006/0002784 | A1 | 1/2006 | Curtis | |
| 2006/0067804 | A1 | 3/2006 | Kornblum | |
| 2014/0003883 | A1 | 1/2014 | Osborn et al. | |
| 2020/0011365 | A1 | 1/2020 | Hoshino et al. | |

FOREIGN PATENT DOCUMENTS

| | | |
|---|---|---|
| JP | 2014-141999 A | 8/2014 |
| KR | 10-2013-0104424 A | 9/2013 |

OTHER PUBLICATIONS

An Office Action mailed by China National Intellectual Property Administration on Oct. 22, 2025, which corresponds to Chinese Patent Application No. 202180082675.3 and is related to U.S. Appl. No. 18/256,383.

An Office Action mailed by the Korean Ministry of Intellectual Property on Oct. 27, 2025, which corresponds to Korean Patent Application No. 10-2023-7022908 and is related to U.S. Appl. No. 18/256,383.

International Search Report issued in PCT/JP2021/016454; mailed Jul. 6, 2021.

An Office Action mailed by China National Intellectual Property Administration on Apr. 30, 2026, which corresponds to Chinese Patent Application No. 202180082675. and is related to U.S. Appl. No. 18/256,383.

* cited by examiner 31a
31A(31)
32a
31Ab
B
22
21
30
1
31a
31Aa
32b
11
32
3
2
2A
X2
X
X1

STUD BOLT

TECHNICAL FIELD

The present invention relates to a stud bolt to be fixed, in a retained state and a rotation stop state, to a mounting target plate.

BACKGROUND ART

In the conventional art, a stud bolt (crimp stud), which is to be fixed in a retained state and a rotation stop state by being press-fitted into a mounting hole of a metal plate (mounting target plate), is known (for example, see Patent Literature 1). The stud bolt includes a head and a screw shaft portion extending from a bearing surface of the head. When fixing a separate member to the metal plate, the screw shaft portion is inserted into a through hole of the separate member, and the screw shaft portion is screwed such that a nut thereof moves in a direction opposite to a screw advance direction of the screw shaft portion, and the separate member is sandwiched and fixed between the nut and the metal plate.

A stud bolt disclosed in Patent Literature 1 includes a non-perfect circular rotation stop portion (a rotation stop protrusion in the document) that bulges from a bearing surface toward a downstream side in a screw advance direction of a screw shaft portion, an annular groove (a holding groove in the document) annularly recessed toward an inner side in a radial direction of the screw shaft portion, and an annular protrusion (a holding ring in the document) protruding in an annular shape at a position adjacent to the annular groove on the downstream side in the screw advance direction. In the technique disclosed in Patent Literature 1, since a protruding portion protruding to a side facing the head is provided around a mounting hole of a metal plate, when press-fitting the stud bolt into the metal plate, the protruding portion is crushed by the rotation stop protrusion, and a large amount of metal is pushed into the holding groove to increase a detachment load and a free-spin torque.

PRIOR ART DOCUMENT

Patent Literature

Patent Literature 1: JP2014-141999A

SUMMARY OF INVENTION

Object to be Achieved by the Invention

However, in the stud bolt disclosed in Patent Literature 1, the metal flowing due to being crushed by the rotation stop protrusion protrudes from a periphery of the mounting hole, which is located on a side opposite to the head, to an outer side in the radial direction with respect to the holding ring, and is likely to become a burr. In addition, the metal crushed by the rotation stop protrusion flows to an outer side in a radial direction of the rotation stop protrusion and causes deformation, and the metal plate is likely to be warped. As a result, troubles may occur, resulting in a decrease in product quality. For example, when fixing a separate member to the metal plate, the separate member may be damaged by the burr, the burr may become a foreign matter and scatter around, and the warped metal plate may interfere with surrounding parts.

Therefore, there is a demand for a stud bolt that can have improved quality when being fixed to a mounting target plate.

Means for Achieving the Object

A characteristic configuration of a stud bolt according to the present invention is a stud bolt to be fixed, in a retained state and a rotation-stopped state, to a mounting target plate, the stud bolt including: a head; a screw shaft portion extending from a bearing surface of the head; a rotation stop portion that is formed in a non-perfect circular shape surrounding the screw shaft portion as viewed in a screw advance direction of the screw shaft portion, and that bulges toward a downstream side in the screw advance direction from the bearing surface; an annular groove of the screw shaft portion that is recessed in an annular shape toward an inner side in a radial direction of the screw shaft portion, at a position adjacent to the rotation stop portion on the downstream side in the screw advance direction; and an annular protrusion of the screw shaft portion that protrudes in an annular shape toward an outer side in the radial direction of the screw shaft portion, at a position adjacent to the annular groove on the downstream side in the screw advance direction. The mounting target plate is to be sandwiched between the bearing surface and the annular protrusion, A recessed portion recessed toward an upstream side in the screw advance direction is formed in the rotation stop portion.

In the stud bolt having the configuration, the rotation stop portion, which bulges from the hearing surface of the head, the annular groove, and the annular protrusion are arranged in order along the screw advance direction, and the recessed portion recessed toward the upstream side in the screw advance direction is formed in the rotation stop portion. Accordingly, when the rotation stop portion crushes the mounting target plate, the mounting target plate that flows due to plastic deformation enters the recessed portion in addition to the annular groove, so that the mounting target plate is prevented from protruding to the outer side in the radial direction of the annular protrusion. As a result, a burr is prevented from being generated, and the quality is not impaired.

In addition, since the mounting target plate enters the annular groove, a detachment load can be secured, and since the mounting target plate also enters the recessed portion, a shearing area of the mounting target plate can be increased, and a free-spin torque can be increased. In addition, since the mounting target plate preferentially enters the recessed portion, the mounting target plate is less likely to protrude to the outer side in the radial direction of the recessed portion, and warpage of the mounting target plate can be prevented and the quality can be improved. In this way, it is possible to provide a stud bolt that can improve the quality obtained when being fixed to a mounting target plate.

In another characteristic configuration, the recessed portion is formed to become deeper as getting closer to the screw shaft portion.

As in this configuration, when the recessed portion is formed to become deeper as getting closer to the screw shaft portion, the mounting target plate that flows due to being crushed is smoothly guided in a direction of the annular groove. As a result, it is possible to appropriately secure a detachment load by the mounting target plate entering the annular groove.

In another characteristic configuration, an inner edge portion of the recessed portion reaches the annular groove, and the recessed portion and the annular groove are continuous with each other.

As in this configuration, when the recessed portion and the annular groove are continuous with each other, the mounting target plate that flows due to being crushed is guided without a barrier in the direction of the annular groove. As a result, it is possible to appropriately secure a detachment load by the mounting target plate entering the annular groove.

In another characteristic configuration, the recessed portion reaches an outer edge portion of the rotation stop portion, and a projection that protrudes in a tapered state toward the downstream side in the screw advance direction is formed at the outer edge portion.

As in this configuration, when the recessed portion is extended to the outer edge portion of the rotation stop portion and the projection protruding in a tapered state is formed at the outer edge portion of the rotation stop portion, the projection can bite into the mounting target plate and the free-spin torque can be increased. Moreover, since the projection serves as a barrier, the mounting target plate entering the recessed portion is less likely to protrude to the outer side in the radial direction of the projection, and the warpage of the mounting target plate can be reliably prevented.

In another characteristic configuration, the projection is formed to have a cross-sectional shape in which the projection includes an inclined portion on a side of the screw shaft portion and includes an erecting portion having a steeper gradient than the inclined portion on a side opposite to the screw shaft portion.

As in this configuration, when the projection is inclined toward the side of the screw shaft portion and the projection is erected on the side opposite to the screw shaft portion with a steep gradient, the mounting target plate further enters the recessed portion, and it is possible to reliably prevent the mounting target plate from protruding to the outer side in the radial direction of the recessed portion. Moreover, even in a case where a metal plate is rotated and a rotational torque is applied to the stud bolt, since the erecting portion is erected at a steep gradient, a component force in a detachment direction of the stud bolt is reduced, and the detachment load can be appropriately secured.

In another characteristic configuration, the recessed portion is formed in an endless shape surrounding the screw shaft portion.

As in this configuration, when the recessed portion has an endless shape surrounding the screw shaft portion, the mounting target plate that flows due to being crushed is guided without a barrier in the direction of the annular groove. As a result, it is possible to appropriately secure a detachment load by the mounting target plate entering the annular groove.

EMBODIMENTS FOR CARRYING OUT THE INVENTION

Hereinafter, an embodiment of a stud bolt according to the present invention will be described with reference to the drawings. In the present embodiment, a stud bolt to be press-fitted into a metal plate serving as a mounting target plate will be described as an example. However, the present invention is not limited to the following embodiment, and various modifications can be made within a range not departing from the gist of the invention.

Figure 1:
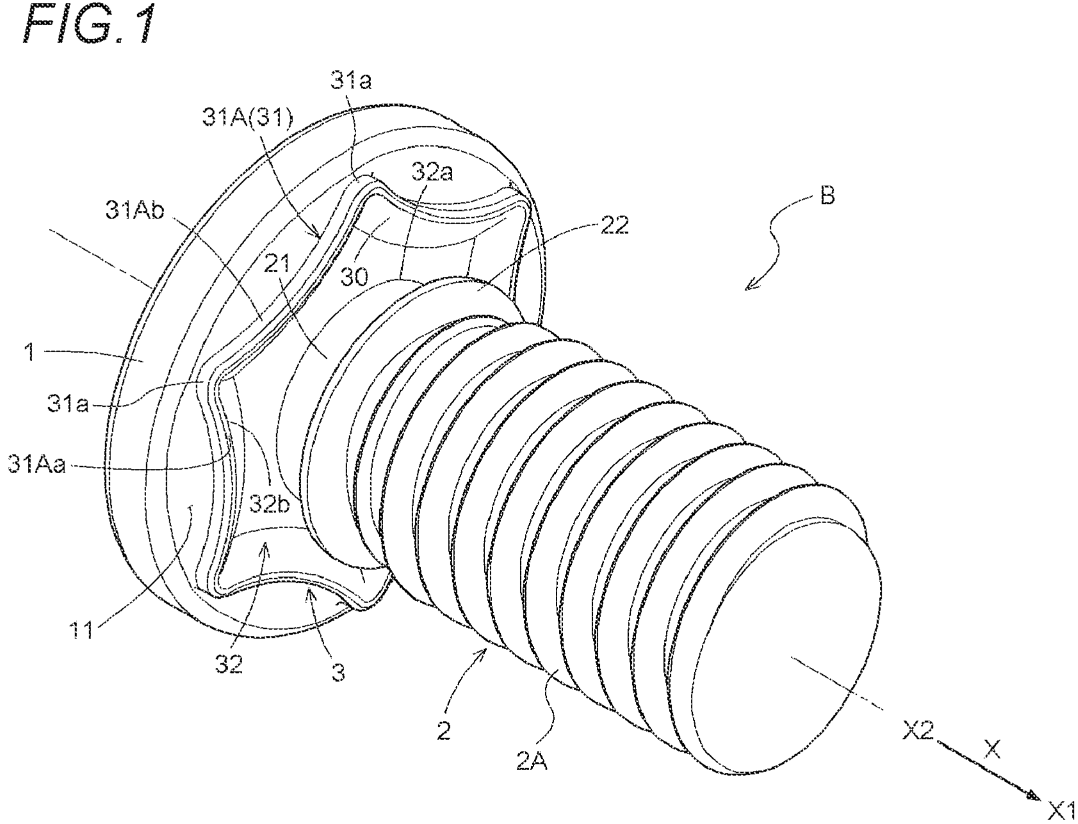
FIG. 1 is a perspective view of a stud bolt.
Figure 2:
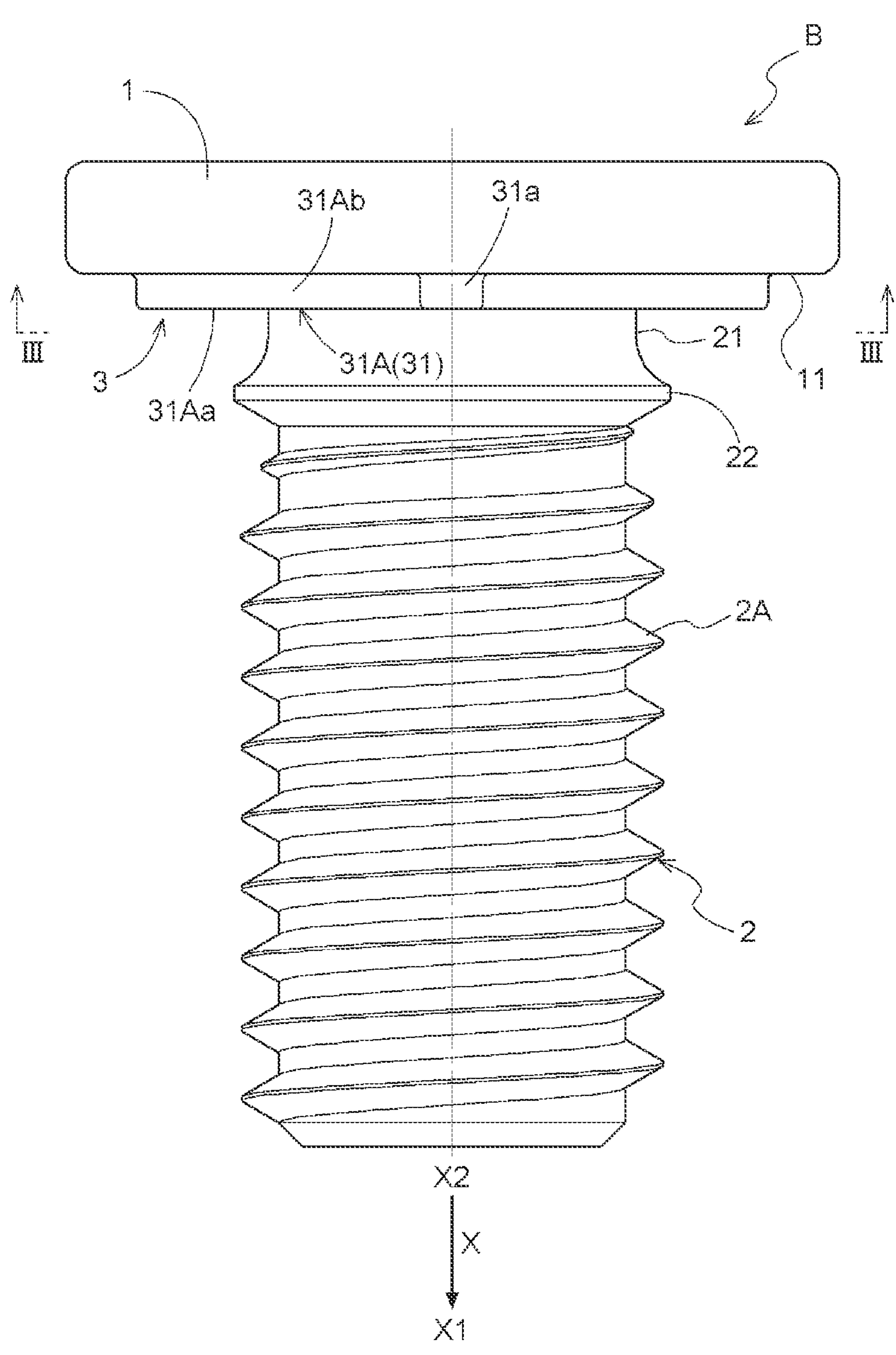
FIG. 2 is a side view of the stud bolt.

As illustrated in FIGS. 1 and 2, a stud bolt B includes a flat columnar head 1 having a pair of edge portions along a circumferential direction rounded, and a screw shaft portion 2 extending from a hearing surface 11 of the head 1. A male screw portion 2A is formed at most of the screw shaft portion 2, and a screw advance direction X of the screw shaft portion 2 coincides with an extending direction of the screw shaft portion 2. The screw advance direction X means a direction in which the stud bolt B advances with respect to a female screw (not shown) when the male screw portion 2A of the screw shaft portion 2 is screwed into the female screw. Hereinafter, a tip end side of the screw shaft portion 2 is referred to as a downstream side X1 in the screw advance direction, and a base end side of the screw shaft portion 2 (a connection side between the head 1 and the screw shaft portion 2) is referred to as an upstream side X2 in the screw advance direction.

Figure 8:
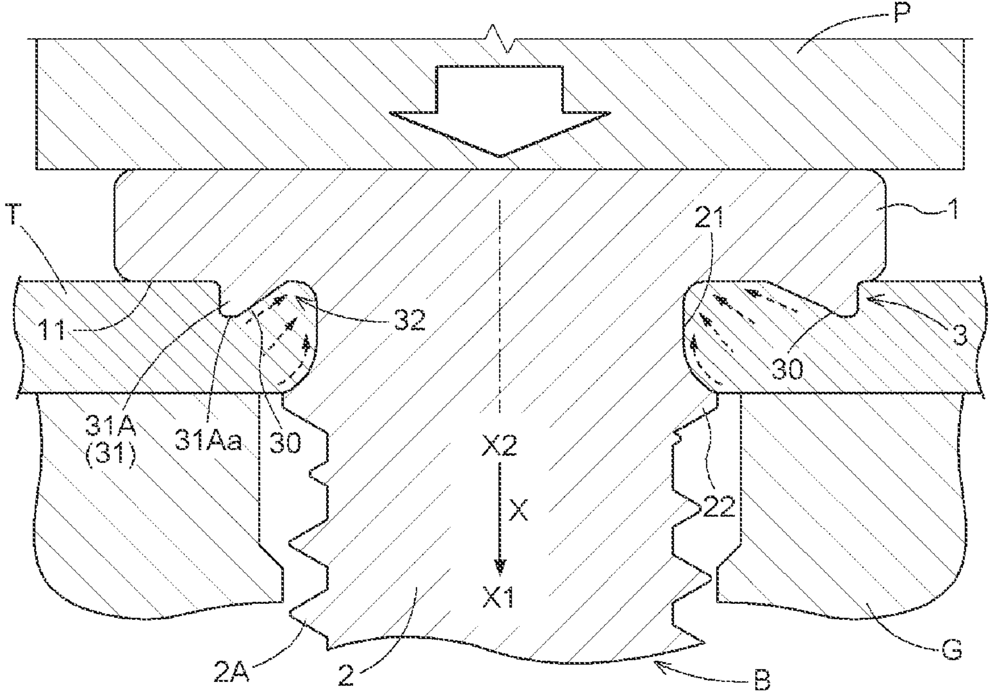
FIG. 8 is a cross-sectional view after the stud bolt is press-fitted into a mounting target plate.

As illustrated in FIG. 8, when the stud bolt B is fixed, in a retained state and a rotation stop state, to a metal plate T, the male screw portion 2A of the screw shaft portion 2 protrudes from the metal plate T, and is exposed to the outside when a jig G is removed. The stud bolt B is made of a metal material such as low-carbon steel having rigidity higher than that of the metal plate T, and the stud bolt B is press-fitted into the metal plate T by a hydraulic press P, and the metal plate T is crushed. As a result, the metal plate T is sandwiched between the bearing surface 11 of the head 1 and an annular protrusion 22 to be described later.

As illustrated in FIGS. 1 and 2, the stud bolt B includes a rotation stop portion 3 that bulges from the bearing surface 11 of the head 1 toward the downstream side X1 in the screw advance direction, an annular groove 21 that is recessed in an annular shape toward an inner side in a radial direction of the screw shaft portion 2, and the annular protrusion 22 that protrudes in an annular shape toward an outer side in the radial direction of the screw shaft portion 2. The annular groove 21 is located adjacent to the rotation stop portion 3 on the downstream side X1 in the screw advance direction in the screw shaft portion 2, and the annular protrusion 22 is located adjacent to the annular groove 21 on the downstream side X1 in the screw advance direction in the screw shaft portion 2. Thus, the rotation stop portion 3, the annular groove 21, and the annular protrusion 22 are arranged in order along the screw advance direction X.

A groove width of the annular groove 21 is set according to a shape of the annular protrusion 22, ductility of the metal plate T, and the like, and is set to be equal to a plate thickness of the metal plate T in the present embodiment (see also FIG. 8). The annular groove 21 and the annular protrusion 22 are continuous in an R shape, and the annular protrusion 22 and the male screw portion 2A are continuous in a tapered shape (see also FIG. 4). The annular groove 21 in the present embodiment has an outer diameter smaller than an outer diameter of the male screw portion 2A formed in the screw shaft portion 2, and the annular protrusion 22 has an outer diameter larger than the outer diameter of the male screw portion 2A formed in the screw shaft portion 2. The diameter of the annular protrusion 22 in the present embodiment is set to be smaller than a diameter of a through hole Ta of the metal plate T (see also FIG. 7).

Figure 3:
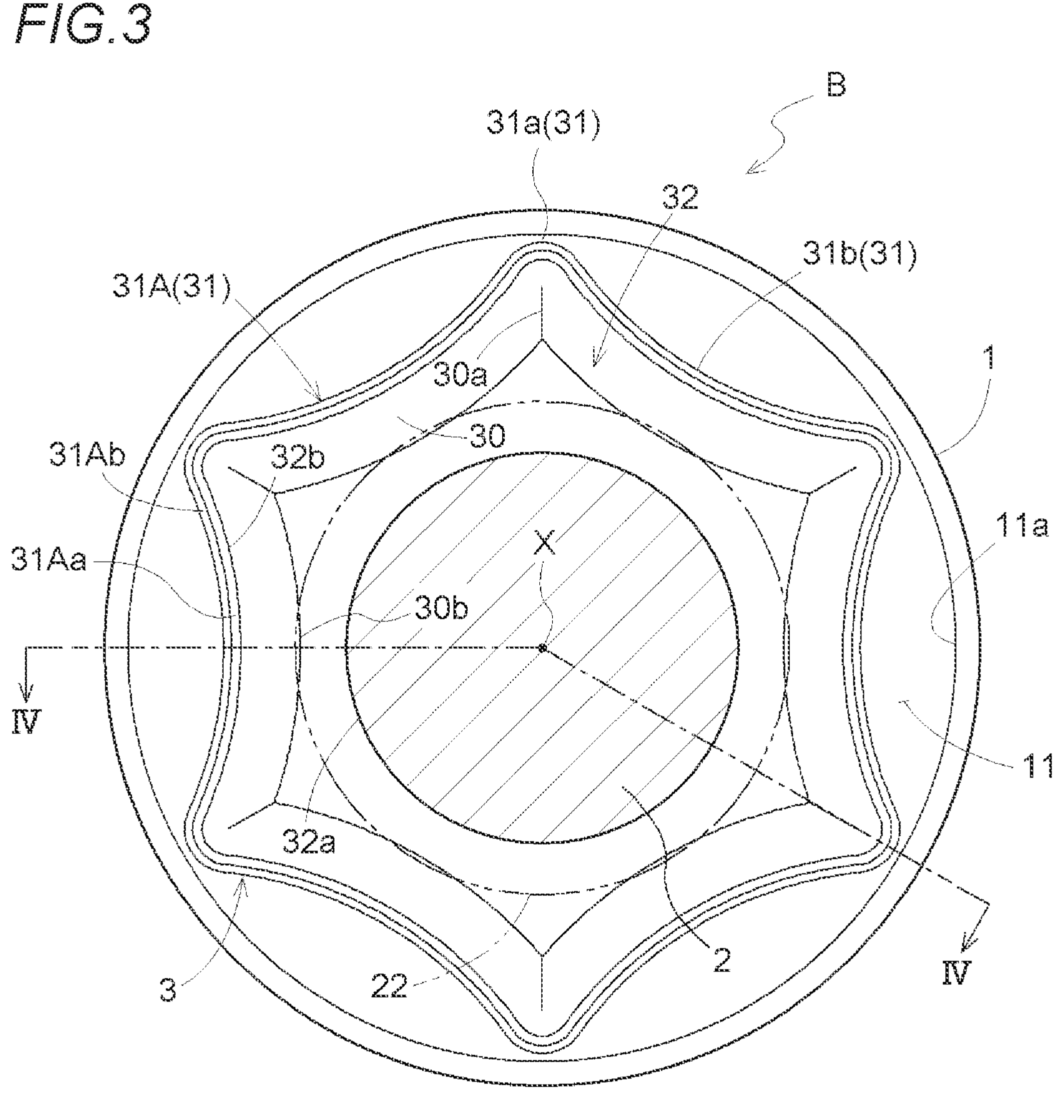
FIG. 3 is an arrow view along a line III-III in FIG. 2.

As illustrated in FIG. 3, the rotation stop portion 3 is formed in a hexagonal star shape (an example of a non-perfect circular shape) surrounding the screw shaft portion 2 as viewed from the screw advance direction X. An outer edge portion 31 of the rotation stop portion 3 includes round corner portions 31*a* that are a plurality of (six in the present embodiment) vertices radially arranged, and a plurality of (six in the present embodiment) connection edges 31*b* each of which is recessed toward the inner side in the radial direction and connects a pair of round corner portions 31*a*. A circumscribed circle of the plurality of round corner portions 31*a* has the same diameter as an outer peripheral edge portion 11*a* of the bearing surface 11. In the rotation stop portion 3 according to the present embodiment, since the round corner portion 31*a* is formed in a pointed shape, the connection edge 31*b* can be moved as much as possible to the outer side in the radial direction as compared with a case where the round corner portion 31*a* bulges in a semi-circular shape, and thus a cubic capacity of a recessed portion 32, which will be described later, can be increased. With such a shape of the rotation stop portion 3, when the rotation stop portion 3 is press-fitted into the metal plate T, the stud bolt B is in a rotation stop state with respect to the metal plate T.

Figure 4:
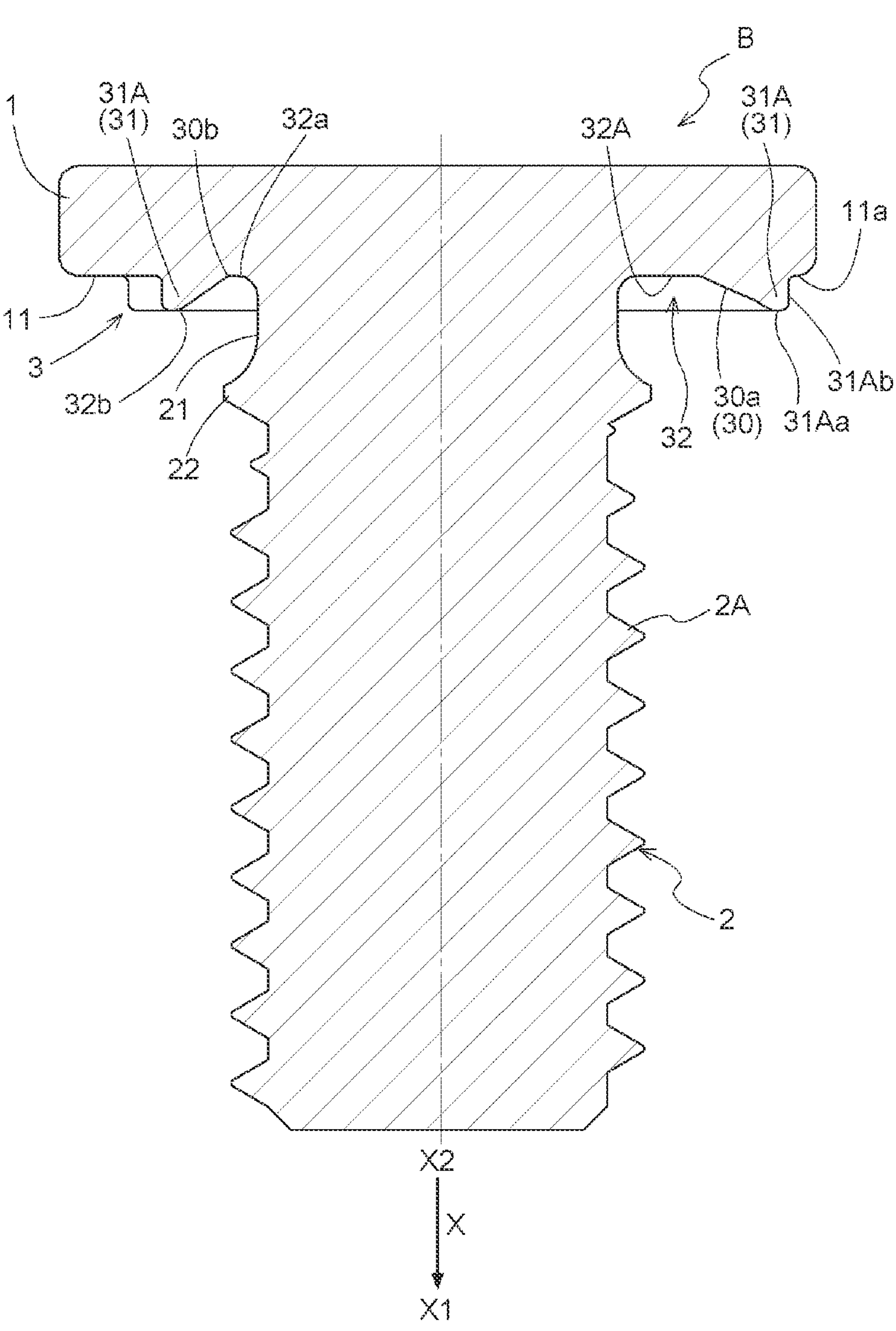
FIG. 4 is a cross-sectional view taken along a line IV-IV in FIG. 3.

As illustrated in FIG. 4, the rotation stop portion 3 is formed with the recessed portion 32 that is recessed in an annular shape toward the upstream side X2 in the screw advance direction (see also FIG. 1). Due to the recessed portion 32, a projection 31A projecting toward the downstream side X1 in the screw advance direction is formed on the outer edge portion 31 of the rotation stop portion 3. The projection 31A is formed at the same height over the whole area. When the metal of the metal plate T enters the recessed portion 32 and the annular groove 21, the stud bolt B enters a retained state and a rotation stop state with respect to the metal plate T. A cubic capacity of the recessed portion 32 and the annular groove 21 that accommodate the metal of the metal plate T is set according to a volume, ductility and the like of the metal plate T that flows due to plastic deformation by being crushed by the projection 31A (see also FIG. 8). An inner edge portion 32*a* of the recessed portion 32 reaches the annular groove 21 of the screw shaft portion 2, and is continuous with the annular groove 21 in an R shape. An outer edge portion 32*b* of the recessed portion 32 reaches a most protruding end 31Aa (the outer edge portion 31 of the rotation stop portion 3) of the projection 31A, and is continuous with the projection 31A. The recessed portion 32 and the projection 31A include an inclined portion 30 whose cross-sectional shape is inclined, and the inclined portion 30 is a portion that connects the recessed portion 32 and the projection 31A. Further, the projection 31A includes an erecting portion 31Ab, whose cross-sectional shape has a steeper gradient than that of the inclined portion 30, on a side opposite to the screw shaft portion 2.

The recessed portion 32 includes the inclined portion 30 that becomes deeper as getting closer to the screw shaft portion 2 from the most protruding end 31Aa, and includes a linear portion 32A having a linear cross section and formed in parallel at a height equal to that of the bearing surface 11 from an inner end 30*b* of the inclined portion 30 to the inner edge portion 32*a*. Thus, the recessed portion 32 includes the linear portion 32A that has the inner end 30*b* of the inclined portion 30 as a gradient change end and that has a gentler gradient than the inclined portion 30. The linear portion 32A is continuous but has different lengths around an axis of the screw shaft portion 2 (hereinafter referred to as a "circumferential direction"). Accordingly, a cross-sectional shape of the rotation stop portion 3 along the radial direction (cut by a line segment passing through a center of the screw shaft portion 2 and being perpendicular to the outer edge portion 31 of the rotation stop portion 3) is formed by continuous non-similar shapes over the entire circumference. The projection 31A includes the inclined portion 30 on a screw shaft portion 2 side and the erecting portion 31Ab on the side opposite to the screw shaft portion 2, and is tapered toward the downstream side X1 in the screw advance direction due to the most protruding end 31Aa connecting the inclined portion 30 and the erecting portion 31Ab. The inner edge portion 32*a* of the recessed portion 32 in the present embodiment reaches the annular groove 21 over the entire circumference, and the annular groove 21 and the recessed portion 32 are continuous with each other over the entire circumference (see also FIG. 1). Further, the outer edge portion 32*b* of the recessed portion 32 reaches the most protruding end 31Aa of the projection 31A over the entire circumference, and the recessed portion 32 and the projection 31A are continuous with each other over the entire circumference due to the inclined portion 30. Thus, the recessed portion 32 is formed in an endless shape surrounding the screw shaft portion 2.

Figure 5:
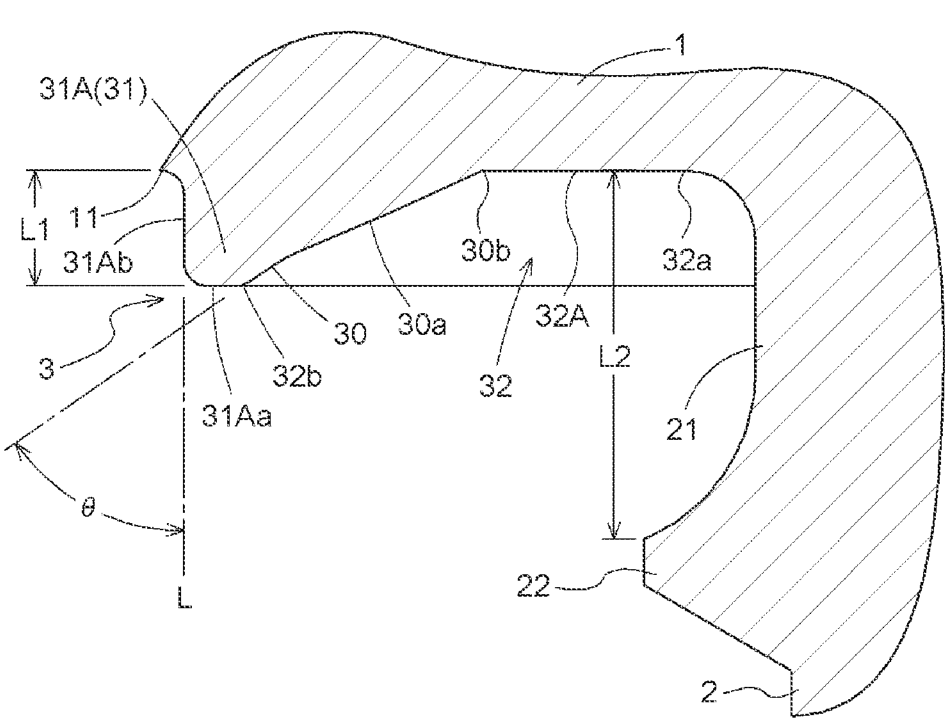
FIG. 5 is an enlarged cross-sectional view of a projection at a position farthest from an annular protrusion.
Figure 6:
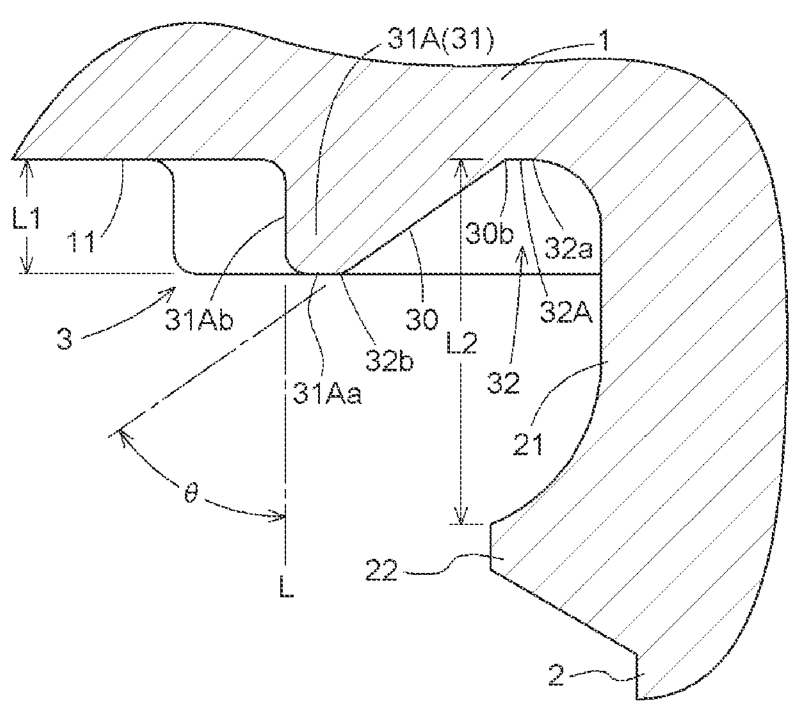
FIG. 6 is an enlarged cross-sectional view of the projection at a position closest to the annular protrusion.

FIG. 5 illustrates an enlarged cross-sectional view in which the projection 31A is cut at a position farthest from the annular protrusion 22, that is, cut by a line segment passing through the round corner portion 31*a*, which is located at the same position as the outer peripheral edge portion 11*a* of the bearing surface 11 illustrated in FIG. 3, and the center of the screw shaft portion 2. FIG. 6 illustrates an enlarged cross-sectional view in which the projection 31A is cut at a position closest to the annular protrusion 22, that is, cut by a line segment passing through a portion of the connection edge 31*b* illustrated in FIG. 3, which is located on the innermost side in the radial direction, and the center of the screw shaft portion 2.

As illustrated in FIGS. 5 and 6, the erecting portion 31Ab of the projection 31A is formed perpendicularly to the bearing surface 11 of the head 1, and an inclination angle θ of the inclined portion 30 with respect to a virtual vertical line L parallel to the erecting portion 31Ab is set to about 55 degrees. As illustrated in FIG. the inclined portion 30 located at the round corner portion 31*a* includes a connecting inclined portion 30*a* that connects the adjacent inclined portions 30 in the circumferential direction, and the connecting inclined portion 30*a* is formed to have a gentler gradient than the inclination angle θ. Due to the connecting inclined portions cross-sectional shapes of the inclined portions 30 of the adjacent connection edges 31*b* along the radial direction of the rotation stop portion 3 are discontinuous in the circumferential direction (see also FIG. 3). The inclination angle θ may be 45 degrees or more and 70 degrees or less, preferably 50 degrees or more and 60 degrees or less, and more preferably about 55 degrees. When the inclination degree θ is less than 45 degrees, since a wall thickness of the projection 31A is too small, fluidity at the time of casting decreases and rigidity decreases. When the inclination angle θ exceeds 70 degrees, since the projection

31A is too large, the cubic capacity of the recessed portion 32 is reduced and an accommodating volume for the metal becomes insufficient. A height L1 of the projection 31A is set to about ⅓ of a groove width L2 of the annular groove 21. The height L1 of the projection 31A is preferably ¼ or more and ½ or less of the groove width L2 of the annular groove 21. When the height L1 is less than ¼ of the groove width L2, the cubic capacity of the recessed portion 32 is reduced and the accommodating volume for the metal is insufficient. When the height L1 is more than ½ of the groove width L2, the metal is less likely to smoothly flow to the recessed portion 32.

As illustrated in FIGS. 3 and 6, at a position where the projection 31A is closest to the annular protrusion 22, the inner end 30*b* of the inclined portion 30 in the present embodiment is located slightly at an inner side in the radial direction with respect to an outermost periphery of the annular protrusion 22 as viewed in the screw advance direction X. With this configuration, the stud bolt B in a state of being press-fitted into the metal plate T can secure a large area of the bearing surface 11 facing the metal plate T (see also FIG. 8). As a result, it is possible to secure a large volume of the metal plate T entering between the pair of adjacent round corner portions 31*a* of the bearing surface 11, and it is possible to increase the free-spin torque. In addition, since the inner end 30*b* of the inclined portion 30 is located at the inner side in the radial direction with respect to the outermost periphery of the annular protrusion 22, the metal having a thickness accommodated in the annular groove 21 and the recessed portion 32 is dominant for a detachment load, and the detachment load can be increased.

Next, operations and effects obtained when the stud bolt B according to the present embodiment is press-fitted into the metal plate T will be described with reference to FIGS. 7 and 8. The metal plate T is a thin plate made of metal, such as a steel plate, in which the through hole Ta larger than the diameter of the annular protrusion 22 and smaller than an outer diameter of the rotation stop portion 3 is formed in advance, and is supported by the jig G that can withstand a pressing force of the hydraulic press P.

Figure 7:
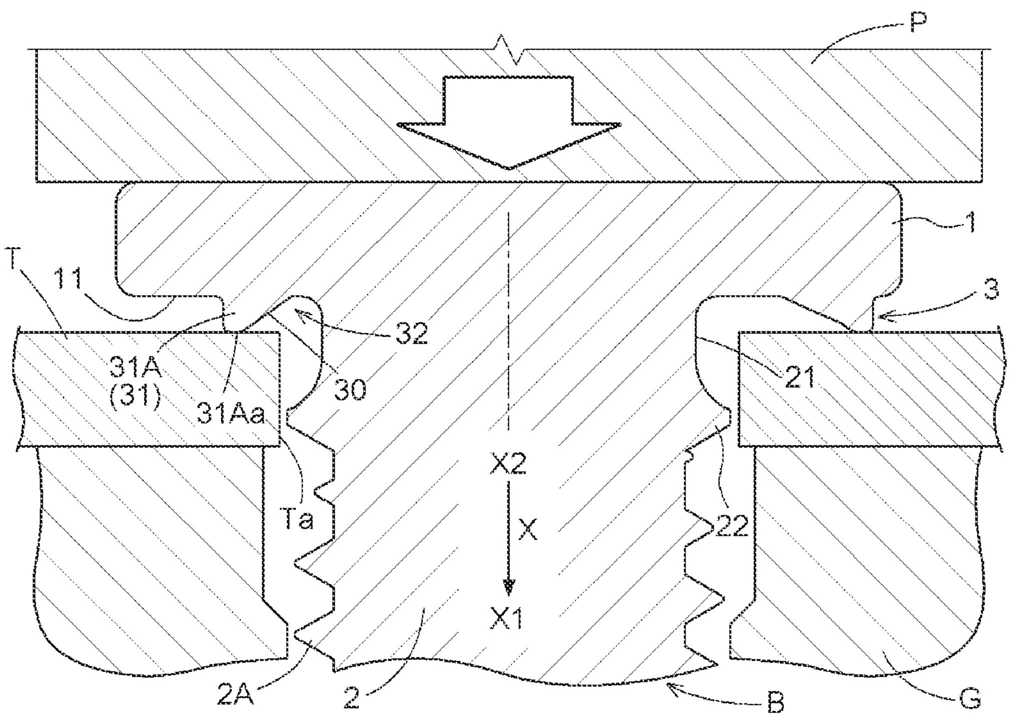
FIG. 7 is a cross-sectional view before the stud bolt is press-fitted into a mounting target plate.

As illustrated in FIG. 7, in the stud bolt B before being press-fitted into the metal plate T, the most protruding end 31Aa of the rotation stop portion 3 is brought into contact with a periphery of the through hole Ta, and the hydraulic press P is brought into contact with the head 1. At this time, the annular protrusion 22 is accommodated inside the through hole Ta, and the male screw portion 2A of the screw shaft portion 2 protrudes toward a side of the jig G.

Next, as illustrated in FIGS. 7 and 8, when the head 1 is pressed by the hydraulic press P, the stud bolt B moves downward (toward the downstream side X1 in the screw advance direction) while the projection 31A of the rotation stop portion 3 bites into the metal plate T, and the stud bolt B is press-fitted until the bearing surface 11 comes into contact with the metal plate T. At this time, the metal of the crushed metal plate T corresponding to the volume of the projection 31A smoothly flows to the inner side in the radial direction along the inclined portion 30, and is accommodated in the recessed portion 32 and the annular groove 21. As a result, the stud bolt B when being fixed to the metal plate T is excellent in overall appearance.

In the stud bolt B according to the present embodiment, the rotation stop portion 3, which bulges from the bearing surface 11 of the head 1, the annular groove 21, and the annular protrusion 22 are arranged in order along the screw advance direction X, and the recessed portion 32 recessed toward the upstream side X2 in the screw advance direction is formed in the rotation stop portion 3. Accordingly, when the rotation stop portion 3 crushes the metal plate T, the metal of the metal plate T enters the recessed portion 32 in addition to the annular groove 21, so that the metal is prevented from protruding to an outer side in a radial direction of the annular protrusion 22. As a result, a burr is prevented from being generated, and therefore, when a separate member is fixed to the metal plate T, there is no trouble that the separate member is damaged by the burr or that the burr becomes a foreign matter and scatters around, and the quality can be improved. In addition, since the metal of the metal plate T enters the annular groove 21, the detachment load can be secured, and since the metal of the metal plate T also enters the recessed portion 32, a shearing area of the metal plate T can be increased, and the free-spin torque can be increased. Moreover, since the metal plate T preferentially enters the recessed portion 32, it is difficult for the metal plate T to protrude to the outer side in the radial direction of the recessed portion 32, and warpage of the metal plate T is prevented. Accordingly, there are no troubles such as one that the warped metal plate T interferes with surrounding parts, and the quality can be improved.

Further, since the recessed portion 32 is formed to become deeper as getting closer to the screw shaft portion 2, the metal of the metal plate T that flows due to being crushed is smoothly guided in a direction of the annular groove 21. Since the recessed portion 32 and the annular groove 21 are continuous with each other over the entire circumference, the metal of the metal plate T that flows due to being crushed is guided without a barrier in the direction of the annular groove 21. In other words, since the recessed portion 32 has an endless shape surrounding the screw shaft portion 2, the metal of the metal plate T that flows due to being crushed is guided without a barrier in the direction of the annular groove 21, and the cubic capacity of the recessed portion 32 is sufficiently secured. As a result, the protrusion of the flowing metal is further suppressed so that the generation of the burr is prevented, and therefore, it is possible to improve the quality.

In addition, the recessed portion 32 includes: the inclined portion 30 that becomes deeper as getting closer to the screw shaft portion 2 from the most protruding end 31Aa; the connecting inclined portion 30*a* that connects the inclined portions 30 adjacent to each other in the circumferential direction and has a gentler gradient than the inclined portion 30; and the linear portion 32A that has a gentler gradient than the connecting inclined portion 30*a*, and is continuous but has different lengths along the circumferential direction. Accordingly, the cross-sectional shape of the rotation stop portion 3 along the radial direction in the present embodiment is formed by continuous non-similar shapes over the entire circumference. As a result, the flowing metal of the metal plate T enters the recessed portion 32 in a discontinuous shape in the circumferential direction, and the projection 31A and the metal entering the recessed portion 32 come into contact with each other, so that a resistance at the time of idling is generated and the free-spin torque can be increased. In addition, since the linear portion 32A is provided in the recessed portion 32, it is possible to cause a large amount of metal to reach the inner edge portion 32*a* of the recessed portion 32 adjacent to the annular groove 21, and it is possible to further increase the free-spin torque.

In addition, in the present embodiment, since the recessed portion 32 is extended to the outer edge portion 31 of the rotation stop portion 3 and the projection 31A protruding in a tapered state is formed at the outer edge portion 31 of the rotation stop portion 3, the projection 31A bites into the metal plate T and the free-spin torque can be increased. Since the projection 31A is formed to have the same height over the entire area, the projection 31A bites into the metal plate T uniformly, and the free-spin torque can be further increased. In addition, since the projection 31A serves as a barrier, the metal of the metal plate T that enters the recessed portion 32 is less likely to protrude to the outer side in the radial direction of the projection 31A, and the warpage of the metal plate T can be reliably prevented.

In addition, since the projection 31A is inclined toward the screw shaft portion 2 side and the erecting portion 31Ab on the side opposite to the screw shaft portion 2 is erected at a steep gradient, the metal plate T further enters the recessed portion 32, and it is possible to reliably prevent the metal plate T from protruding to the outer side in the radial direction of the recessed portion 32. In addition, even in a case where the metal plate T is rotated and a rotational torque is applied to the stud bolt B, since the erecting portion 31Ab is erected perpendicularly to the metal plate T, a component force in a detachment direction of the stud bolt B becomes extremely small, and the detachment load can be appropriately secured.

Other Embodiments (1) The non-perfect circular shape of the rotation stop portion 3 may be a hexagonal shape in which the connection edge 31*b* is formed in a linear shape, or may be a polygonal shape such as a triangular shape, a quadrangular shape, or a pentagonal shape.

(2) The recessed portion 32 of the rotation stop portion 3 may have any shape such as being partially provided along the circumferential direction, and is not particularly limited. In this case, the cross-sectional shape of the rotation stop portion 3 along the radial direction is preferably formed by non-similar shapes in at least a portion in the circumferential direction. In the case of a shape that can be constituted by non-similar shapes, the inclined portion 30 of the recessed portion 32 may be omitted, and only the linear portion 32A that is continuous but has different lengths along the circumferential direction may be provided, or a plurality of depressions at different positions in the radial direction may be provided along the circumferential direction. In addition, it is preferable that at least the inner edge portion 32*a* of the recessed portion 32 is in a shape of being continuous over the circumferential direction so as to allow the metal entering the recessed portion 32 to flow to the annular groove 21.

(3) Instead of a circular shape, the annular groove 21 and the annular protrusion 22 may be formed in an annular shape having a polygonal outer shape. Further, the through hole Ta of the metal plate T may be formed to be smaller than the diameter of the annular protrusion 22, and an inner peripheral portion of the through hole Ta may in a shape to be crushed by the annular protrusion 22.

(4) The most protruding end 31Aa of the projection 31A may be sharpened. In this case, the most protruding end 31Aa of the most protruding end 31Aa is likely to bite into the metal plate T.

(5) The mounting target plate is not particularly limited as long as the mounting target plate is a plate made of a material having fluidity (ductility) in addition to the metal plate T.

(6) A female screw portion may be formed in the screw shaft portion 2 in place of the male screw portion 2A.

INDUSTRIAL APPLICABILITY

The present invention can be applied as a stud bolt to be fixed, in a retained state and a rotation stop state, to a mounting target plate.

EXPLANATIONS OF REFERENCE SIGNS

1: head
2: screw shaft portion
3: rotation stop portion
11: bearing surface
21: annular groove
22: annular protrusion
30: inclined portion
31: outer edge portion
31A: projection
31Ab: erecting portion
32: recessed portion
B: stud bolt
T: metal plate (mounting target plate)
X: screw advance direction
X1: downstream side in screw advance direction
X2: upstream side in screw advance direction

The invention claimed is:

1. A stud bolt to be fixed, in a retained state and a rotation stop state, to a mounting target plate, the stud bolt comprising:
- a head;
- a screw shaft portion extending from a bearing surface of the head;
- a rotation stop portion that is formed in a non-perfect circular shape surrounding the screw shaft portion as viewed in a screw advance direction of the screw shaft portion, and that bulges toward a downstream side in the screw advance direction from the bearing surface;
- an annular groove of the screw shaft portion that is recessed in an annular shape toward an inner side in a radial direction of the screw shaft portion, at a position adjacent to the rotation stop portion on the downstream side in the screw advance direction; and
- an annular protrusion of the screw shaft portion that protrudes in an annular shape toward an outer side in the radial direction of the screw shaft portion, at a position adjacent to the annular groove on the downstream side in the screw advance direction, wherein
- the mounting target plate is to be sandwiched between the bearing surface and the annular protrusion,
- a recessed portion recessed toward an upstream side in the screw advance direction and having the same non-perfect circular shape as the rotation stop portion is formed in the rotation stop portion,
- the recessed portion includes an inclined portion inclined so as to be closer to the head as the inclined portion goes from the outer side in the radial direction toward the inner side in the radial direction, and a linear portion parallel to the bearing surface, and
- a most protruding end of the inclined portion is for linearly biting into the mounting target plate throughout an entire circumference of the most protruding end.

2. The stud bolt according to claim 1, wherein
- the recessed portion is formed to become deeper as getting closer to the screw shaft portion.

3. The stud bolt according to claim 2, wherein an inner edge portion of the recessed portion reaches the annular groove, and the recessed portion and the annular groove are continuous with each other.

4. The stud bolt according to claim 3, wherein the recessed portion reaches an outer edge portion of the rotation stop portion, and a projection that protrudes in a tapered state toward the downstream side in the screw advance direction is formed at the outer edge portion.

5. The stud bolt according to claim 4, wherein the projection is formed to have a cross-sectional shape in which the projection includes an inclined portion on a side of the screw shaft portion and includes an erecting portion having a steeper gradient than the inclined portion on a side opposite to the screw shaft portion.

6. The stud bolt according to claim 3, wherein the recessed portion is formed in an endless shape surrounding the screw shaft portion.

7. The stud bolt according to claim 2, wherein the recessed portion reaches an outer edge portion of the rotation stop portion, and a projection that protrudes in a tapered state toward the downstream side in the screw advance direction is formed at the outer edge portion.

8. The stud bolt according to claim 7, wherein the projection is formed to have a cross-sectional shape in which the projection includes an inclined portion on a side of the screw shaft portion and includes an erecting portion having a steeper gradient than the inclined portion on a side opposite to the screw shaft portion.

9. The stud bolt according to claim 7, wherein the recessed portion is formed in an endless shape surrounding the screw shaft portion.

10. The stud bolt according to claim 2, wherein the recessed portion is formed in an endless shape surrounding the screw shaft portion.

11. The stud bolt according to claim 1, wherein an inner edge portion of the recessed portion reaches the annular groove, and the recessed portion and the annular groove are continuous with each other.

12. The stud bolt according to claim 11, wherein the recessed portion reaches an outer edge portion of the rotation stop portion, and a projection that protrudes in a tapered state toward the downstream side in the screw advance direction is formed at the outer edge portion.

13. The stud bolt according to claim 12, wherein the projection is formed to have a cross-sectional shape in which the projection includes an inclined portion on a side of the screw shaft portion and includes an erecting portion having a steeper gradient than the inclined portion on a side opposite to the screw shaft portion.

14. The stud bolt according to claim 11, wherein the recessed portion is formed in an endless shape surrounding the screw shaft portion.

15. The stud bolt according to claim 1, wherein the recessed portion reaches an outer edge portion of the rotation stop portion, and a projection that protrudes in a tapered state toward the downstream side in the screw advance direction is formed at the outer edge portion.

16. The stud bolt according to claim 15, wherein the projection is formed to have a cross-sectional shape in which the projection includes an inclined portion on a side of the screw shaft portion and includes an erecting portion having a steeper gradient than the inclined portion on a side opposite to the screw shaft portion.

17. The stud bolt according to claim 16, wherein the recessed portion is formed in an endless shape surrounding the screw shaft portion.

18. The stud bolt according to claim 15, wherein the recessed portion is formed in an endless shape surrounding the screw shaft portion.

19. The stud bolt according to claim 1, wherein the recessed portion is formed in an endless shape surrounding the screw shaft portion.

20. The stud bolt according to claim 19, wherein the recessed portion is formed in an endless shape surrounding the screw shaft portion.

* * * * *